3,328,381
POLYMERIZATION OF ETHYLENE IN THE PRESENCE OF A CATALYST CONSISTING OF A TETRAARYL TITANATE, A VANADIUM HALIDE AND AN ALUMINUM TRIHYDROCARBYL
Willem Frederik Hendrik Borman, Dalton, Mass., assignor to E. I. du Pont de Nemours and Company, Wilmington, Del., a corporation of Delaware
No Drawing. Filed Sept. 23, 1964, Ser. No. 398,733
11 Claims. (Cl. 260—94.9)

This application is a continuation-in-part of copending application Ser. No. 105,874, filed Apr. 27, 1961, and now abandoned.

The present invention relates to an improved process for the preparation of high molecular weight polymers of ethylene using a three-component coordination catalyst comprising the reaction product of a tetraaryl titanate, a vanadium halide, and an aluminum trihydrocarbon.

Coordination catalysts are defined as polymerization catalysts obtained by the reaction of transition metal halides wherein the metal is selected from Groups IV-B to VI-B of the Periodic Table, with metallic reducing agents comprising organometallic compounds, metal hydrides and active metals. A particularly preferred class of reducing agents comprise organometallic aluminum compounds and especially such compounds which may be represented by the general formula $AlR_3$ where R is a hydrocarbon radical. The actual structure of the catalytically active reaction product is not exactly known, but it is believed that the transition metal is present in a reduced valence state, and that the combination of reduced heavy metal and aluminum hydrocarbon brings about initiation of polymerization by coordination with the olefin and formation of high molecular weight polymers when ethylenically unsaturated monomers are added to the reaction product.

The kind of polymer formed from such monomers as ethylene using coordination catalysts depends to a certain degree on the nature of the catalyst components employed to form the coordination catalyst as well as upon reaction conditions. Thus, it has been found that not all combinations of transition metal compounds with metallic reducing agents result in high molecular weight polyethylenes when employed in the polymerization of ethylene. In particular, it has been found that coordination catalysts prepared from reduced aliphatic and aromatic transition metal esters form butenes, hexenes, and other liquid, low-polymers (Belgian Patent 540,136).

Although, in general, coordination catalysts obtained by the reaction of titanium halides with aluminum hydrocarbon compounds give rise to a very active catalyst system, it has been established, British Patent 799,850, that a combination of titanium halides and vanadium halides with aluminum hydrocarbons results in greatly improved catalysts, from the standpoint of reactivity, the activity obtained from the combination being substantially superior to the activity that is obtained from the individual components. The coordination catalysts obtained from the combination of titanium and vanadium halides, therefore, are extremely valuable because of the high yields of polymer, based on catalyst amounts, that can be obtained therewith.

It has now been discovered that coordination catalysts obtained by the reaction of the combination of tetraaryl titanates and vanadium halides with aluminum hydrocarbon compounds result in catalysts which are exceptionally useful for the production of polymers of ethylene of extremely high molecular weight at very high reaction rates.

The process of this invention comprises contacting ethylene, or a mixture of ethylene with a higher α-olefin, with a three-component catalyst consisting of the reaction product of a tetraaryl titanate and a vanadium halide with an aluminum trihydrocarbon compound in an inert hydrocarbon solvent at a temperature in the range of 75° to 220° C., preferably 120° to 200° C., under a pressure sufficient to hold the ethylene in solution, and in the preferred case, sufficient to provide an ethylene concentration in the solvent of from 2–8% by weight, or about 1000 to 2400 p.s.i.

With respect to the catalyst employed in the process of this invention, the mole ratio of vanadium halide to tetraaryl titanate must be in the range of 0.1 to 10, but preferably 0.1 to 5 and the mole ratio of aluminum trihydrocarbon compound to the sum of the titanium tetraaryl titanate plus vanadium halide must be sufficient to reduce the titanium and vanadium, at least in part, to a valence below 3, that is, in the range of 0.3 to 10 but preferably 0.5 to 5.

If an α-olefin comonomer is employed with the ethylene, it must be employed as the minor component, that is, in a mole ratio of α-olefin to ethylene of 0.01 to 0.8.

The process of this invention produces higher molecular weight solid polymers of ethylene at any given temperature than can be achieved using the catalysts and conditions known to the art. This is surprising in view of the art teaching that catalysts comprising titanate esters produce liquid, low polymers.

The polymerization of ethylene when employing coordination catalysts at temperatures above the melting point of the resulting polymer is highly advantageous in that the polymerization proceeds not only at high yields and conversions but also in that the degree of polymerization of the resulting product can be controlled very accurately through temperature. However, the amount of ethylene that can be converted at any particular temperature is limited by the heat of polymerization, the polymerization reaction being exothermic. In accordance with the present invention, it was discovered that if tetraaryl titanates are substituted for titanium halides, the same molecular weight polymer, made at any particular temperature with titanium halide, is made at a substantially higher temperature or conversely that a much higher molecular weight polymer is made at the same temperature. The result of the higher temperature means of course that more heat of polymerization can be allowed in the reaction zone without reducing the molecular weight of the resulting polymer which in turn permits the feeding of more ethylene and the production of more polymer.

The tetraaryl titanates employed in the formation of the catalysts of the present invention are compounds having the general formula $Ti(OR)_4$ where R is an aryl radical and preferably a monoaryl radical by which is meant a single ring aromatic radical such as a phenyl, a $C_1$ to $C_4$ alkyl substituted phenyl radical, or a halogen substituted phenyl radical where the halogen can be fluorine, chlorine, bromine, or iodine. The number of substituted groups on the phenyl radicals may vary from 1 to 4 and is not critical to the operability of the invention. Examples of suitable tetraaryl titanate components are tetraphenyl titanate, tetra-o-cresyl titanate, tetra-p-cresyl titanate, tetra-p-chlorophenyl titanate, tetra-o-bromophenyl titanate, tetra-2,4,6-tribromophenyl titanate, tetra-3,4-xylenyl titanate, tetra-p-ethyl-phenyl titanate, tetra-p-isopropylphenyl titanate, etc.

The vanadium halide component may be any vanadium halide wherein the vanadium has a valence of above three, and, preferably, is a vanadium halide or oxyhalide in which the halogen is a chlorine or a bromine. Examples of suitable vanadium halides include vanadium tetrachloride, vanadium tetrabromide, vanadium oxytrichloride and vanadium oxytribromide.

The aluminum hydrocarbon employed in the reduction of the titanium and vanadium catalyst component is a compound wherein all of the valences of the aluminum are satisfied by hydrocarbon radicals and, thus, can be said to have the general formula $AlR_3$, wherein R is an alkyl, cycloalkyl, aryl, aralkyl, alkaryl, alkenyl and an alkylene radical attached to another aluminum atom. Also, two of the R groups may be joined to form a polymethylene ring with the Al included. Examples of suitable aluminum hydrocarbons include aluminum trimethyl, aluminum triethyl, aluminum triisobutyl, aluminum triphenyl, aluminum tridodecyl, aluminum trioctadecyl, aluminum tricresyl, aluminum tricyclohexenyl, aluminum tribenzyl, aluminum triethylcyclohexyl, aluminum isoprenyl, etc.

The synergistic activity of the titanium and vanadium component is obtained over the entire range of titanium to vanadium molar ratios from 0.1 to 10 but is most outstanding in the range of vanadium to titanium ratios varying from 0.1 to 5. The quantity of the aluminum hydrocarbon reacted with the transition metal components of the catalyst system should be sufficient to reduce the titanium and vanadium at least in part to a valence state below three. In general, molar ratios of the aluminum hydrocarbon to the transition metal components vary from 0.3 to 10, but with 0.5 to 5 being optimum ratios for the reaction conditions employed.

The catalysts employed in the process of the present invention are formed by mixing the components together at a temperature within the range of 0 to 300° C. in the presence of an inert hydrocarbon solvent such as benzene, hexane, cyclohexane, heptane or decahydronaphthalene. The order in which the catalyst components are combined is not critical, although in general it is preferred to combine the transition metal components prior to reaction with the aluminum hydrocarbon.

The invention is further illustrated by the following examples.

Examples I to V

A 450 ml. "Pyrex" polymerization kettle was equipped with a stainless steel stirrer-sparger, thermometer, in- and outlets and wrapped with electrical heating tape. During the polymerization, ethylene was passed through an opening in the stirrer housing into the hollow shaft and out into the reaction vessel through sparge holes located between the blades of the lower of the two four-bladed stirrers. Six liters of nitrogen purged decahydronaphthalene were stored in two three-liter round-bottom flasks. The amounts of titanium component and vanadium oxytrichloride required to result in the concentrations indicated in Table I were added to one flask and aluminum triisobutyl was added to the other flask. The two solutions were pumped with bellow pumps, set to deliver 15 ml./min. each to a mixing T at room temperature and from there directly into the reactor. Hold-up time in the reactor was approximately 6 to 6.5 minutes.

The overflowing polymer solution was passed through a heated glass U-tube and into 500 ml. sample flasks which were replaced every 10 minutes. The solutions were then poured into a threefold excess of acetone, containing some methanol and aqueous hydrogen chloride, and the precipitated polymer was further purified by several washings with acetone and methanol in a Waring Blender. The polymers were finally dried in a vacuum oven at 70° C. The specific conditions and results are illustrated in Table I as follows:

TABLE I

| Example | Titanium Component | Conc. in mmol/l. | Vanadium Component Conc. in mmol/l. | Aluminum triisobutyl Conc. in mmol/l. | Reaction Temp., ° C. | Yield in Percent | Melt Index,[1] g./10 min. | Weight,[2] Average Molecular Weight | Inherent viscosity[3] | Weight, Average Molecular Weight[4] |
|---|---|---|---|---|---|---|---|---|---|---|
| I | $TiCl_4$ | 1.6 | 5.6 | 19.8 | 120 | 2.10 | 1.1 | 115,000 | 1.60 | 108,000 |
| II | $TiCl_4$ | 0.8 | 2.3 | 9.0 | 120 | 1.82 | 0.763 | 125,000 | 1.75 | 120,000 |
| III | Tetraphenyl titanate | 0.9 | 2.5 | 8.4 | 120 | 2.00 | 0.085 | 230,000 | 2.77 | 235,000 |
| IV | Tetra-p-chlorophenyl titanate | 0.8 | 2.4 | 10.0 | 120 | 2.04 | 0.181 | 188,000 | 2.40 | 192,000 |
| V | Tetracresyl titanate | 0.8 | 2.4 | 10.0 | 120 | 2.19 | 0.041 | 230,000 | 2.75 | 235,000 |

[1] ASTM-D-1238-57T.
[2] Determined from melt index (MI) by log, $M_w = 5.068 - 0.275 \log MI$.
[3] Employing a 0.2 g. solution of polymer in 100 ml. of decahydronaphthalene at 135° C.
[4] Determined from inherent viscosity by log, $M_w = 4.723 + 1.466 \log (\eta)$.

Example VI

Using the procedure described in the foregoing examples, Examples I and III are repeated using vanadium tetrachloride instead of vanadium oxytrichloride. Substantially the same increase in molecular weight is observed.

Example VII

Using the procedure described in the foregoing examples, Examples I and III are repeated using vanadium tetrabromide instead of vanadium oxytrichloride. An increase in molecular weight is obtained with tetraphenyl titanate.

Example VIII

Using the procedure described in the foregoing examples, Examples I and III are repeated using aluminum isoprenyl, obtained by the reaction of aluminum triisobutyl with isoprene, instead of aluminum triisobutyl. The use of the tetraphenyl titanate results in a higher molecular weight ethylene polymer.

Examples IX, X, XI, and XII

Continuous ethylene polymerizations were conducted in a well-stirred autoclave under a pressure of 1000 p.s.i. The solvent, cyclohexane, was fed at 7 liters per hour and ethylene at 800 g. per hour. Reaction temperatures, catalyst components and concentration, and product evaluation are shown in Table II.

TABLE II

| Example No. | Feed Rate (millimoles/hr.) | | | | Reaction Temp., ° C. | Intrinsic Viscosity[1] of Polymer |
|---|---|---|---|---|---|---|
| | $TiCl_4$ | Ti(p-cresylate)$_4$ | $VOCl_3$ | Al Isoprenyl | | |
| IX | 0.2 | | 0.6 | 1.4 | 180 | 4.3 |
| X | | 0.2 | 0.6 | 1.4 | 200 | 4.1 |
| XI | 0.6 | | 0.2 | 1.4 | 135 | 2.6 |
| XII | | 0.6 | 0.2 | 1.4 | 150 | 2.8 |

[1] Measured in α-chloronaphthalene at 125° C.

Comparison of Example X with Example IX and of Example XII with Example XI shows that the process of this invention results in the production of polyethylene of high molecular weight at higher temperatures than could be done according to the prior art, as represented by Examples IX and XI.

The foregoing examples have shown the significant increase in molecular weight obtained in the polymers of ethylene when substituting tetraaryl titanates for titanium halides in coordination catalysts employing a combination of titanum and vanadium components with an aluminum hydrocarbon reducing agent without a loss of yield. It will be apparent that the invention described is not limited to the specific components illustrated but can be employed with the type of titanium, vanadium and aluminum compounds hereinabove defined. Both the aluminum hydrocarbon component and the vanadium component behave in the catalyst system of the present invention in accordance with the chemical activity established for these compounds in the prior art. The improved catalytic activity obtained with the catalyst systems of the present invention, however, is not obtained when a tetraalkoxy titanate is substituted for the tetraaryl titanate in the described polymerization procedure.

Thus the process of this invention is useful for producing high-molecular weight polymers of ethylene at the high reaction temperatures, rates and yields desired for commercial operations without sacrifice of molecular weight. At the lower temperatures within the range of the process, exceptionally high-molecular weight polymers of ethylene can be obtained. Such polymers are useful in applications where exceptional toughness and stress-crack resistance are desired. They are also useful for blending with lower molecular weight polyethylenes to obtain products of wide molecular weight distribution which are particularly valuable for film and wire-coating applications where they exhibit improved processability.

I claim:

1. A solution process for the production of a normally solid, high molecular weight polymer of ethylene which comprises contacting an olefin, selected from the group consisting of pure ethylene and mixtures of ethylene with a higher $\alpha$-olefin in which ethylene is the major component, with a three-component catalyst, consisting of the reaction product of a tetraaryl titanate, a vanadium halide, in which the vanadium has a valence above three selected from the group consisting of vanadium tetrahalides and vanadium oxytrihalides, and an aluminum trihydrocarbon, in an inert hydrocarbon solvent at a temperature in the range of 120° to 220° C., such that the polymer produced remains in solution, and under a pressure in the range of 1000 to 2400 p.s.i. sufficient to hold the ethylene in solution, the mole ratio of said vanadium halide to said tetraaryl titanate being from 0.1 to 10 and the mole ratio of said aluminum trihydrocarbon compound to the sum of the tetraaryl titanate plus vanadium halide being from 0.3 to 10.

2. The process of claim 1 in which the mole ratio of the vanadium halide to the tetraaryl titanate is from 0.1 to 5 and the mole ratio of the aluminum trihydrocarbon compound to the sum of the tetraaryl titanates plus vanadium halide is from 0.5 to 5.

3. The process of claim 1 in which the vanadium halide is $VOCl_3$.

4. The process of claim 1 in which the tetraaryl titanate is tetraphenyl titanate.

5. The process of claim 1 in which the tetraaryl titanate is tetra-p-cresyl titanate.

6. The process of claim 1 in which the temperature is from 150° to 200° C.

7. The process of claim 1 in which the aluminum trihydrocarbon is aluminum triisobutyl.

8. The process of claim 1 in which the aluminum trihydrocarbon is aluminum isoprenyl.

9. A solution process for the production of a normally solid, high molecular weight polyethylene which comprises contacting ethylene with a three-component catalyst, consisting of the reaction product of tetra-p-cresyl titanate, vanadium oxytrichloride, and aluminum isoprenyl in an inert hydrocarbon solvent at a temperature in the range of 120° to 220° C., such that the polymer produced remains in solution, and under a pressure in the range of 1000 to 2400 p.s.i., the mole ratio of said vanadium oxytrichloride to said tetra-p-cresyl titanate being from 0.1 to 5 and the mole ratio of said aluminum isoprenyl to the sum of the tetra-p-cresyl titanate plus vanadium oxytrichloride being from 0.5 to 5.

10. The process of claim 9 in which the inert hydrocarbon solvent is cyclohexane.

11. The process of claim 9 in which the temperature is from 150° to 200° C.

References Cited

UNITED STATES PATENTS

| | | | |
|---|---|---|---|
| 2,824,089 | 2/1958 | Peters et al. | 260—88.2 |
| 2,886,561 | 5/1959 | Reynolds et al. | 260—94.9 |
| 3,061,602 | 10/1962 | Duck et al. | 260—94.9 |
| 3,073,811 | 1/1963 | Natta et al. | 260—93.7 |
| 3,114,744 | 12/1963 | Lasky | 260—94.3 |

FOREIGN PATENTS

| | | |
|---|---|---|
| 799,850 | 8/1958 | Great Britain. |
| 563,350 | 6/1958 | Belgium. |

JOSEPH L. SCHOFER, *Primary Examiner.*

M. B. KURTZMAN, *Assistant Examiner.*